(12) United States Patent
Gillard

(10) Patent No.: US 9,211,598 B2
(45) Date of Patent: Dec. 15, 2015

(54) ELECTRO-HYDRAULIC TRIMMING OF A PART PERIMETER WITH MULTIPLE DISCRETE PULSES

(71) Applicant: Ford Global Technologies, LLC, Dearborn, MI (US)

(72) Inventor: Alan John Gillard, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 14/090,208

(22) Filed: Nov. 26, 2013

(65) Prior Publication Data

US 2015/0143863 A1    May 28, 2015

(51) Int. Cl.
| | |
|---|---|
| *B21D 26/031* | (2011.01) |
| *B23D 15/14* | (2006.01) |
| *B21D 26/023* | (2011.01) |
| *B21D 26/12* | (2006.01) |
| *B26F 1/28* | (2006.01) |
| *B23D 31/00* | (2006.01) |
| *B21D 24/16* | (2006.01) |

(52) U.S. Cl.
CPC .............. *B23D 15/14* (2013.01); *B21D 26/023* (2013.01); *B21D 26/12* (2013.01); *B23D 31/00* (2013.01); *B23D 31/001* (2013.01); *B26F 1/28* (2013.01); *B21D 24/16* (2013.01)

(58) Field of Classification Search
CPC ...... B21D 24/16; B21D 26/031; B21D 26/06; B21D 26/08; B21D 26/10; B21D 26/12; B21D 26/023; B21D 28/007; B21D 28/14; B21D 28/26; B23D 15/14; B23D 15/145; B23D 31/00; B23D 31/001; B26F 1/28

USPC .............. 72/55–57, 60, 63, 379.2, 58, 61, 62, 72/324, 327, 331, 333, 338; 29/421.1, 29/421.2
See application file for complete search history.

(56) References Cited

U.S. PATENT DOCUMENTS

| | | |
|---|---|---|
| 3,420,079 A | 1/1969 | Erlandson |
| 5,941,112 A | 8/1999 | Ghiran et al. |
| 6,227,023 B1 | 5/2001 | Daehn et al. |
| 6,513,359 B1 | 2/2003 | Binder et al. |
| 6,708,542 B1 | 3/2004 | Gafri et al. |
| 6,751,994 B2 | 6/2004 | Horton et al. |
| 7,155,948 B2 | 1/2007 | Hellgren |
| 7,165,429 B2 | 1/2007 | Steingroever |
| 7,493,787 B2 * | 2/2009 | Golovashchenko et al. ...... 72/63 |
| 7,614,270 B2 * | 11/2009 | Luckey et al. .................... 72/57 |

(Continued)

OTHER PUBLICATIONS

Sergey F. Golovaschenko et al., Electrohydraulic Trimming of Advanced and Ultra High Strength Steels, Journal of Materials Processing Technology (2013).

*Primary Examiner* — Peter DungBa Vo
*Assistant Examiner* — Joshua D Anderson
(74) *Attorney, Agent, or Firm* — Damian Porcari; Brooks Kushman P.C.

(57) ABSTRACT

A trim tool for trimming a part having a complex shape. The trim tool defines a plurality of electro-hydraulic cavities that are separated by walls in a lower die of the trim tool. Electrodes are discharged in the electro-hydraulic cavities to drive the panel into engagement with a trim steel edge. The discharge of the electrode severs the panel above the cavity and also across a portion of a wall separating adjacent cavities. Discharging an electrode in an adjacent cavity completes the trim operation above the wall.

7 Claims, 2 Drawing Sheets

(56) References Cited

U.S. PATENT DOCUMENTS

| | | | |
|---|---|---|---|
| 7,802,457 B2 * | 9/2010 | Golovashchenko et al. | 72/56 |
| 7,810,366 B2 | 10/2010 | Golovashchenko | |
| 2009/0272165 A1 * | 11/2009 | Golovashchenko | 72/55 |
| 2010/0175447 A1 * | 7/2010 | Golovashchenko | 72/55 |
| 2012/0180542 A1 | 7/2012 | Golovashchenko | |

* cited by examiner

ELECTRO-HYDRAULIC TRIMMING OF A PART PERIMETER WITH MULTIPLE DISCRETE PULSES

STATEMENT REGARDING FEDERALLY SPONSORED RESEARCH OR DEVELOPMENT

This invention was made with Government support under Contract No. DE-FG36-08GO18128. The Government has certain rights to the invention.

TECHNICAL FIELD

This disclosure relates to a method and apparatus for trimming the perimeter of a part having a complex shape.

BACKGROUND

Electro-hydraulic trimming is performed by providing a liquid in a cavity that is provided with a single electrode or a pair of electrodes that are connected to a source of stored electrical charge, such as a bank of capacitors. The sheet metal panel to be trimmed is placed on an opening of the cavity and a trim steel having a cutting edge is assembled over the sheet metal panel. The stored charge is discharged through the electrodes to force the sheet metal panel against the cutting edge to trim the sheet metal panel. Electro-hydraulic trimming has been limited to applications that require trimming a sheet metal panel in a straight line of a limited length.

This disclosure is directed to the objective of expanding the potential range of applications for electro-hydraulic trimming to include trimming parts having a complex shape.

SUMMARY

According to one aspect of this disclosure, a tool is provided for trimming a sheet metal panel having a complex shape. The tool includes a lower die having a part receiving nest. The tool defines a plurality of cavities that surround the nest. Adjacent cavities are separated by a wall. The cavities are filled with a liquid, such as water, and are each provided with at least one electrode. An upper die includes a cutting edge that extends about the periphery of the panel above the cavities. The cutting edge bridges the walls that separate the cavities. The panel extends across the cavities and the walls between the cavities. The periphery of the panel is trimmed by discharging stored charges in sequence through the electrodes.

According to other aspects of this disclosure, a first discharge in a first cavity causes the panel to be trimmed above the first cavity and partially across two walls adjacent spaced ends of the first cavity. A second discharge in a second cavity adjacent the first cavity causes the panel to be trimmed above the second cavity and partially across the two walls adjacent spaced ends of the second cavity to completely sever the panel between the first cavity and the second cavity. The stored charges are sequentially discharged in each of the plurality of cavities with each discharge driving the panel against the cutting edge to trim the panel above each cavity and to trim at least half way across the two walls separating the cavity from one of the other cavities that are adjacent the cavity.

A plurality of seals may be attached to the lower die with each seal extending about one of the cavities so that the seals contacting the panel separate the liquid in one cavity from the other cavities. After sealing the cavities, the stored charge is discharged between the electrodes and the lower die.

The nesting surface generally conforms to the complex shape of the panel and the cutting edge of the upper die conforms to the complex shape of the panel.

According to another aspect of this disclosure, a method is disclosed for trimming a sheet metal panel having a complex shape in a trim tool having a lower die including a plurality of electro-hydraulic cavities disposed inboard of a periphery of the panel. An upper die has a cutting edge disposed on a trim line inboard of the periphery of the panel. The method comprises the steps of inserting the panel between the upper die and the lower die and clamping the panel against the lower die with the cutting edge of the upper die engaging the panel. An electrode is discharged in a first one of the electro-hydraulic cavities to force a portion of the panel directly above the first one of the electro-hydraulic cavities to be trimmed against the cutting edge. An adjacent portion of the panel is forced into engagement with the cutting edge that is disposed above a wall separating the first one of the electro-hydraulic cavities from an adjacent second one of the electro-hydraulic cavities.

The above disclosed method may further comprise discharging a second electrode in a second one of the electro-hydraulic cavities to force a second portion of the panel directly above the second one of the electro-hydraulic cavities to be trimmed against the cutting edge. A second adjacent portion of the panel that is disposed above the wall separating the first one of the electro-hydraulic cavities from the second one of the electro-hydraulic cavities is forced into engagement with the cutting edge. The panel is trimmed across the first one of the electro-hydraulic cavities, the wall and the second one of the electro-hydraulic cavities.

The above disclosed method may further comprise discharging a plurality of electrodes sequentially in the plurality of the electro-hydraulic cavities to force a plurality of portions of the panel directly above the plurality of the electro-hydraulic cavities to be trimmed against the cutting edge. A plurality of adjacent portions of the panel that are disposed above a plurality of walls separating the plurality of electro-hydraulic cavities from the plurality of electro-hydraulic cavities are forced into engagement with the cutting edge to complete trimming the panel across the plurality of electro-hydraulic cavities and the plurality of walls.

An alternative method is disclosed for trimming an edge of a panel that comprises placing the panel on a die defining a plurality of cavities that contain a liquid. The cavities are each separated from each other by one of a plurality of walls. A stored electrical charge is sequentially discharged in each one of the cavities through a plurality of electrodes with at least one electrode being disposed in each one of the cavities. The panel is trimmed against a cutting edge with each discharge and a portion of the panel above one of the cavities and at least one portion of the panel above one of the walls of the cavities is trimmed with each discharge.

In accordance with the alternative method, the plurality of cavities may be disposed about a peripheral portion of the panel below the cutting edge. The cutting edge follows the edge of the panel. The panel is a three dimensional panel that includes a three dimensional part inside the outer edge of the panel. A second portion of the panel above an adjacent cavity to the one cavity and the at least one portion of the wall above the one wall is completely severed in a subsequent discharge.

The above aspects of this disclosure and other aspects are described below in greater detail with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
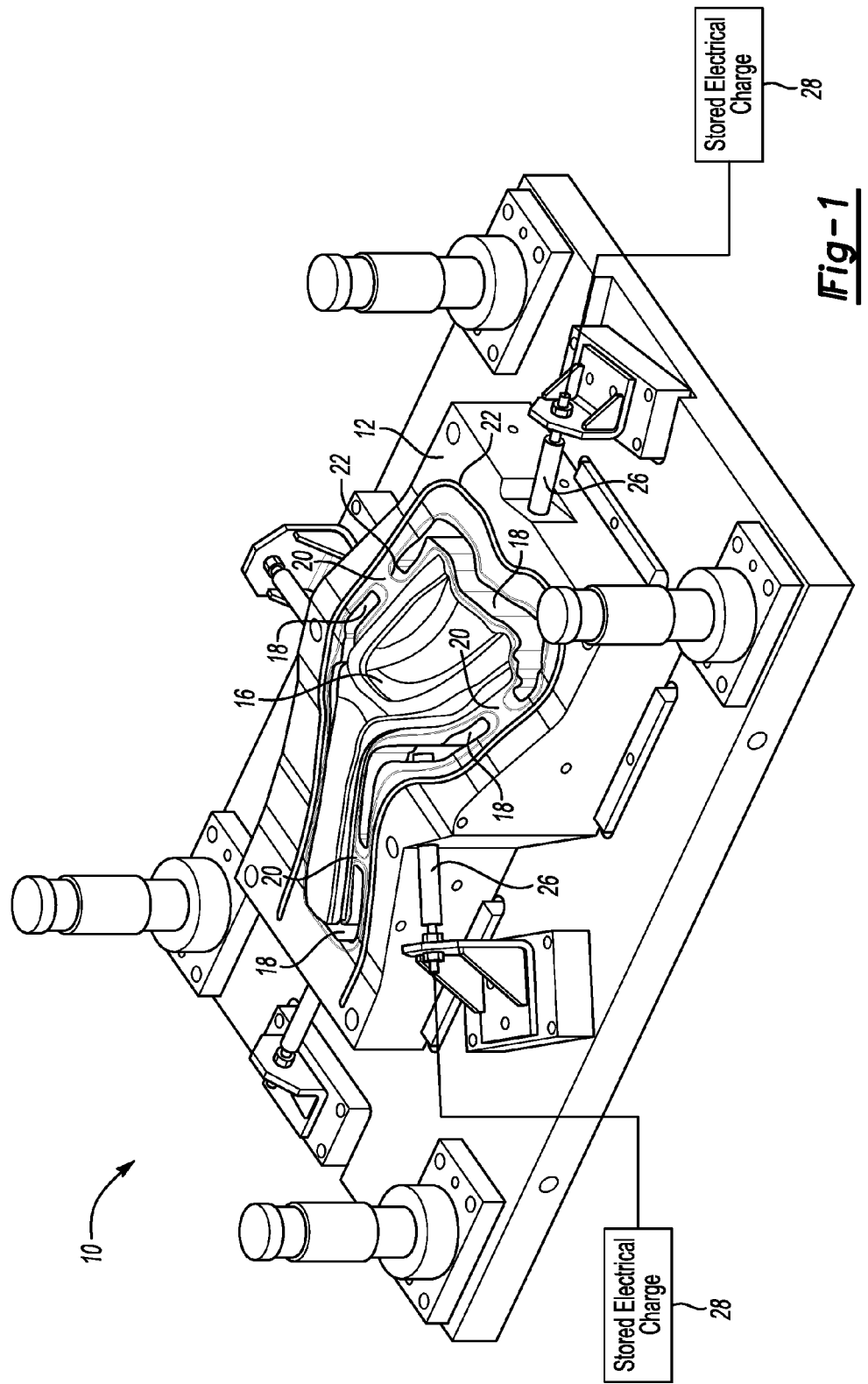
FIG. 1 is a perspective view of a lower die of a tool for trimming a panel having a complex shape.

Referring to FIG. 1, a trim tool 10 is partially illustrated with the lower die 12 shown in isolation and the upper die (shown in FIG. 2) removed for visibility. The lower die 12 includes a part nest 16 that is adapted to receive a sheet metal panel to be trimmed (shown in FIG. 2). A plurality of electro-hydraulic cavities 18 are defined in the lower die 12 that extend around the entire periphery of the part nest 16. The electro-hydraulic cavities 18 are separated by walls 20. Seals 22 are provided on the lower die 12 that extend around the electro-hydraulic cavities 18. A plurality of electrodes 26 are provided with at least one electrode 26 being provided in each of the electro-hydraulic cavities 18. In the illustrated embodiment, a single electrode 26 is provided in each electro-hydraulic cavity 18, but it should be understood that paired electrodes may also be provided in each cavity. In the illustrated embodiment, the electrodes 26 are discharged when a stored electrical charge source 28 is operatively connected to the electrodes 26. The source of stored electrical charge 28 may be a bank of capacitors. The electrodes 26, in the illustrated embodiment, form an arc with the lower die 12 within the electro-hydraulic cavities 18.

Figure 2:
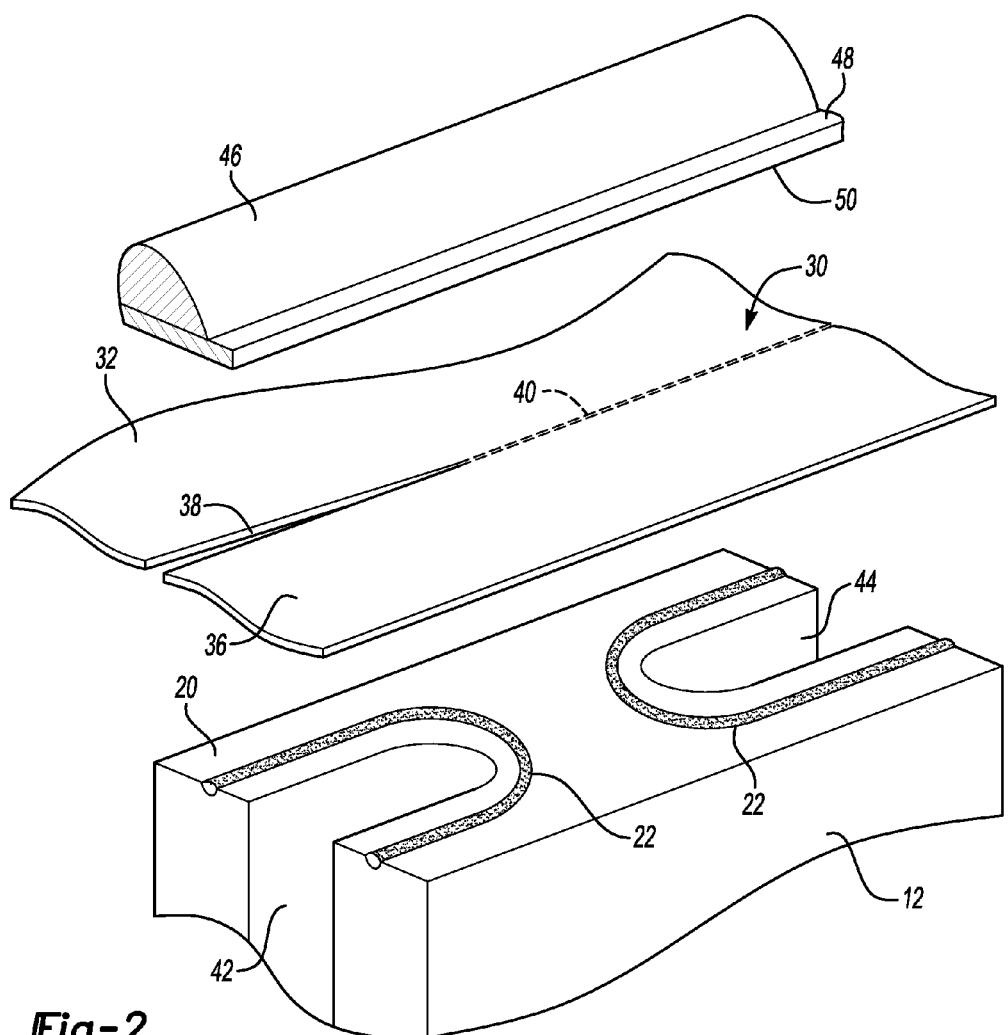
FIG. 2 is a fragmentary exploded perspective view of a tool for trimming a part having a complex shape.

Referring to FIG. 2, a sheet metal panel 30 is partially shown that includes a portion of a part 32 having a complex shape. Trim scrap 36 is partially severed from the panel 30 with a first trim cut 38 forming a first trim portion of the panel 30. A second trim cut line 40 is shown in dashed lines in FIG. 2 that will be cut when a subsequent electrode (shown in FIG. 1) receives a charge from a source of stored electrical charge 28. The first trim cut 38 is made when the electrode 26 in a first cavity 42 is discharged. A second cavity 44, or adjacent cavity, to the first cavity 42 is subsequently used to cut the second trim cut line 40 when the electrode 26 in the adjacent cavity 44 receives a charge from the source of stored electrical charge 28 (shown in FIG. 1). An upper die 46 is partially shown in FIG. 2 that supports a shaped trim steel 48. Trim steel 48 has a trim steel edge 50 that follows the contour of the part 32 having a complex shape is received in the part nest 16 of the lower die 12.

Referring to FIGS. 1 and 2, the trim tool 10 is used to trim a sheet metal panel 30 having a complex shape. The trim tool 10 includes a lower die 12 that has a part receiving nest 16. The tool 10, or lower die 12, defines a plurality of cavities 18 that surround the nest 16. Adjacent cavities are separated by walls 20. The cavities 18 are filled with a liquid, such as water that may include a rust preventative, and are each sealed with a seal 22 that extends around the periphery of the cavities 18 and forms a seal against the panel 30. Each electro-hydraulic cavity 18 includes an electrode 26 that is connected to a source of stored electrical charge 28.

The upper die 46 supports a trim steel 48 that defines a trim steel edge 50. When the electrodes 26 in each of the cavities 18 are discharged, the panel 30 is driven into engagement with the trim steel edge 50 that trims the sheet metal panel 30. The electrodes 26 in adjacent cavities 18 are sequentially discharged. When the panel is driven against the trim steel edge 50 above the cavity 18, the panel is severed in the area above the walls 20 due to the momentum of the panel 30 being driven against the trim steel edge 50. When an adjacent cavity 18 is discharged, a second trim portion 40, shown in phantom lines 40 in FIG. 2, is cut and the first and second trim cuts form a continuous cut that spans the area above the wall 20.

A first discharge in the first cavity 42 causes the panel 30 to be trimmed above the first cavity 42 and partially across two walls 20 on adjacent spaced ends of the first cavity 42. A second discharge in a second cavity 44 adjacent the first cavity 42 causes the panel to be trimmed above the second cavity 44 to completely sever the portion of the panel 30 between the first cavity 42 and the second cavity 44. The source of stored electrical charge is discharged sequentially in each of the cavities 42, 44 with each discharge driving the panel 30 against the trim steel cutting edge 50. The panel 30 above each cavity 42, 44 trims across the walls 20.

Figure 3:
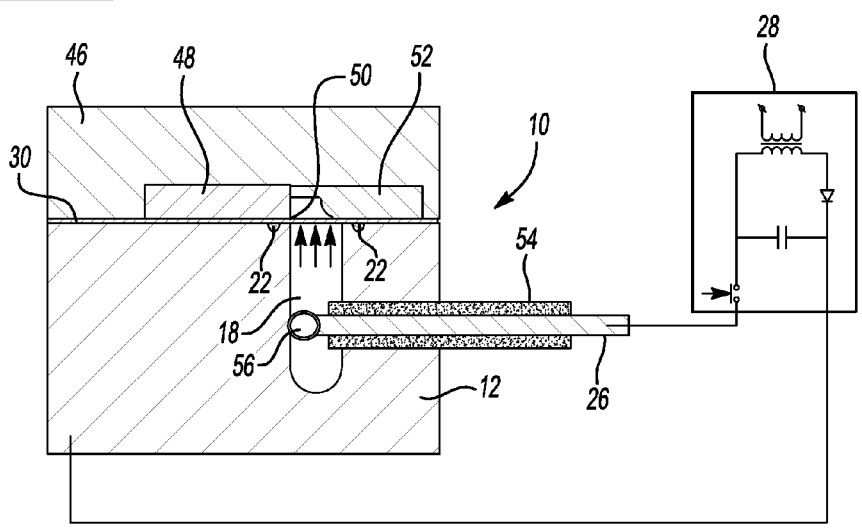
FIG. 3 is a diagrammatic cross-sectional view of a tool for trimming a part connected to a pulsed-current generator for electro-hydraulic trimming.

Referring to FIG. 3, the trim tool 10 is illustrated with the lower die 12 supporting the panel 30 to be trimmed that is clamped in place by the upper die 46. The upper die includes the trim steel 48 that has the trim steel edge 50 on the panel 30 above an edge of the cavity 18. An offal guiding insert 52 guides the scrap trimmed from the panel 30 during the trimming operation.

The electro-hydraulic cavity 18 is filled with a liquid. The electrode 26 is inserted into the cavity 18 and is insulated from the lower die 12 by a polyurethane insulator 54. The stored electrical charge 28 is connected to the electrode 26 and the lower die 12. A plasma discharge 56 forms a plasma channel within the cavity 18 when the stored electrical charge is discharged through the electrode 26. The discharge drives the unsupported part of the panel 30 upwardly and trims the panel against the trim steel edge 50.

This disclosure also relates to a method for trimming a sheet metal panel 30 having a complex shape and a trim tool 10 having a lower die 12 that includes a plurality of electro-hydraulic cavities 18 that are disposed inboard of the periphery of the panel 30. An upper die 46 supports a trim steel 48 having a cutting edge 50 that is disposed on a trim line located inboard of the periphery of the panel 30. The panel 30 is inserted between the upper die 46 and the lower die 12. The upper die 46 clamps the panel 30 against the lower die 12 with the cutting edge 50 of the trim steel 48 engaging the panel 30.

An electrode 26 is discharged in a first electro-hydraulic cavity 42 to force a portion of the panel 30 directly above the first electro-hydraulic cavity 42 to be trimmed against the cutting edge 50. An adjacent portion of the panel 30 is forced into engagement with the cutting edge 50 that is disposed above a wall 20 separating the first electro-hydraulic cavity 42 from an adjacent second electro-hydraulic cavity 44.

A second electrode 26 and a second electro-hydraulic cavity 44 forces a second portion of the panel 30 directly above the second electro-hydraulic cavity 44 to be trimmed against the trim steel edge 50. An adjacent portion of the panel 30 that is disposed above the wall 20 separating the first electro-hydraulic cavity 42 from the second electro-hydraulic cavity 44 is forced into engagement with the cutting edge 50. The panel 30 is trimmed to cut across the first electro-hydraulic cavity 42, the wall 20 and the second electro-hydraulic cavity 44.

A plurality of electrodes 26 are sequentially discharged in each of the electro-hydraulic cavities 18 to force a plurality of portions of the panel 30 directly above the plurality of electro-hydraulic cavities 18 to be trimmed against the cutting edge 50. A plurality of adjacent portions of the panel 30 disposed above the walls 20 separating the electro-hydraulic cavities 18 are forced into engagement with the cutting edge 50 to complete trimming the panel across the electro-hydraulic cavities 18 and the walls 20.

While exemplary embodiments are described above, it is not intended that these embodiments describe all possible forms of the disclosure. The words used in the specification are words of description rather than limitation. Changes may be made to the illustrated embodiments without departing from the spirit and scope of the disclosure as claimed. The features of the illustrated embodiments may be combined to form further embodiments of the disclosed concepts.

What is claimed is:

1. A tool for trimming a panel comprising:
a lower die having plural adjacent cavities disposed around the panel and separated by walls, each cavity containing a liquid and an electrode;
an upper die having a cutting edge extending around the panel and bridging the walls between adjacent cavities, the panel being trimmed above each cavity and partially across the walls of each cavity by the cutting edge when stored charges are discharged through the electrodes.

2. The tool of claim 1 wherein each of the stored charges are sequentially discharged, and wherein a first discharge in a first cavity causes the panel to be trimmed above the first cavity and partially across two walls adjacent spaced ends of the first cavity.

3. The tool of claim 2 wherein a second discharge in a second cavity adjacent the first cavity causes the panel to be trimmed above the second cavity and partially across the two walls adjacent spaced ends of the second cavity to completely sever the panel between the first cavity and the second cavity.

4. The tool of claim 1 wherein the stored charges are sequentially discharged in each of the plurality of cavities, and wherein each discharge drives the panel against the cutting edge to trim the panel above each cavity and to trim at least halfway across two walls separating the cavity from two cavities that are adjacent the cavity.

5. The tool of claim 1 further comprising a plurality of seals attached to the lower die with each seal extending about one of the plurality of cavities, wherein the seals separate the liquid in one cavity from two other cavities.

6. The tool of claim 1 wherein the stored charge is discharged between each electrode and the lower die.

7. The tool of claim 1 wherein the lower die has a nesting surface that conforms to the complex shape of the panel, and wherein the cutting edge of the upper die conforms to the complex shape of the panel.

* * * * *